April 4, 1939.  B. J. BUTLER  2,153,297

THERMOSTATIC CONTROL

Filed May 4, 1936  4 Sheets-Sheet 1

Benjamin J. Butler,
Inventor,
Delos F. Haynes,
Attorney.

April 4, 1939.  B. J. BUTLER  2,153,297

THERMOSTATIC CONTROL

Filed May 4, 1936  4 Sheets-Sheet 2

Benjamin J. Butler,
Inventor,
Delos G. Haynes,
Attorney.

April 4, 1939.  B. J. BUTLER  2,153,297
THERMOSTATIC CONTROL
Filed May 4, 1936  4 Sheets-Sheet 3
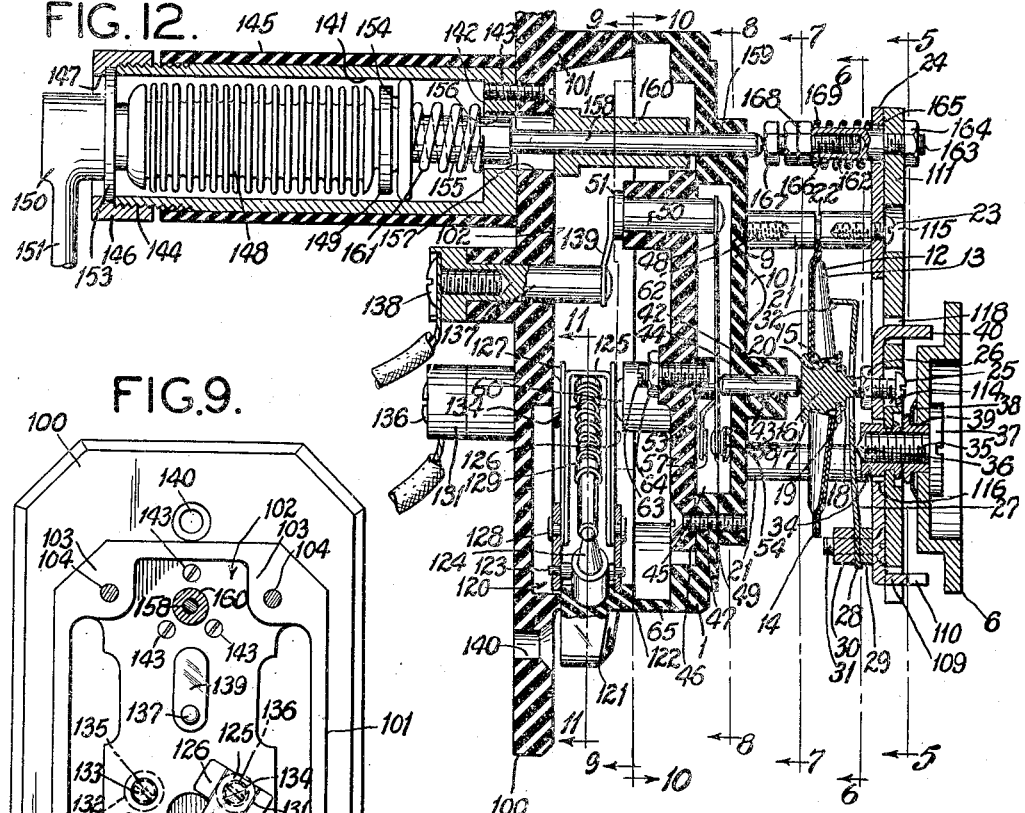
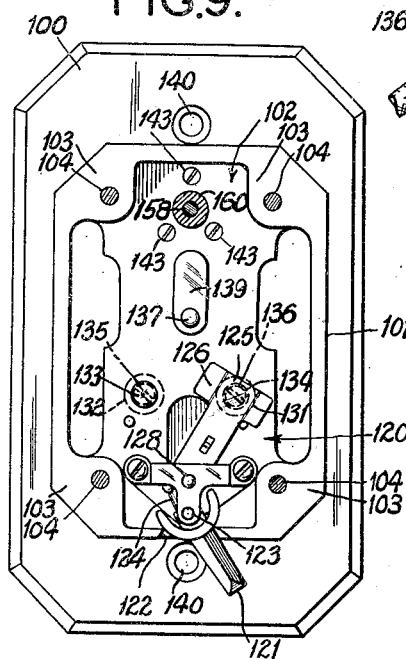
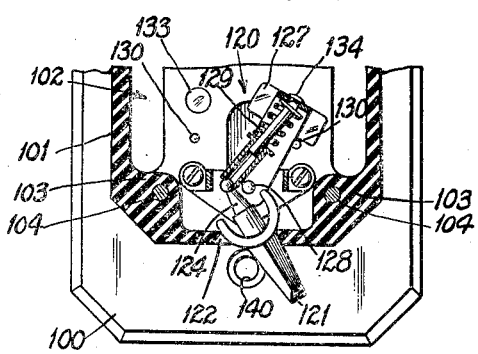
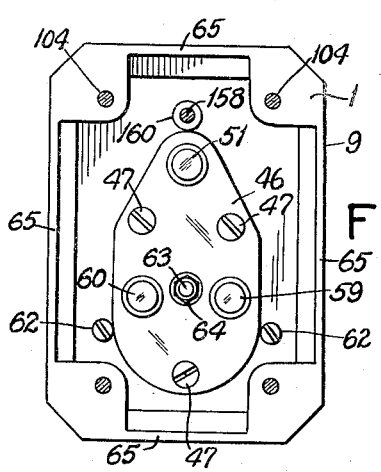
Benjamin J. Butler,
Inventor,
Delos G. Haynes,
Attorney April 4, 1939.   B. J. BUTLER   2,153,297
THERMOSTATIC CONTROL
Filed May 4, 1936   4 Sheets-Sheet 4
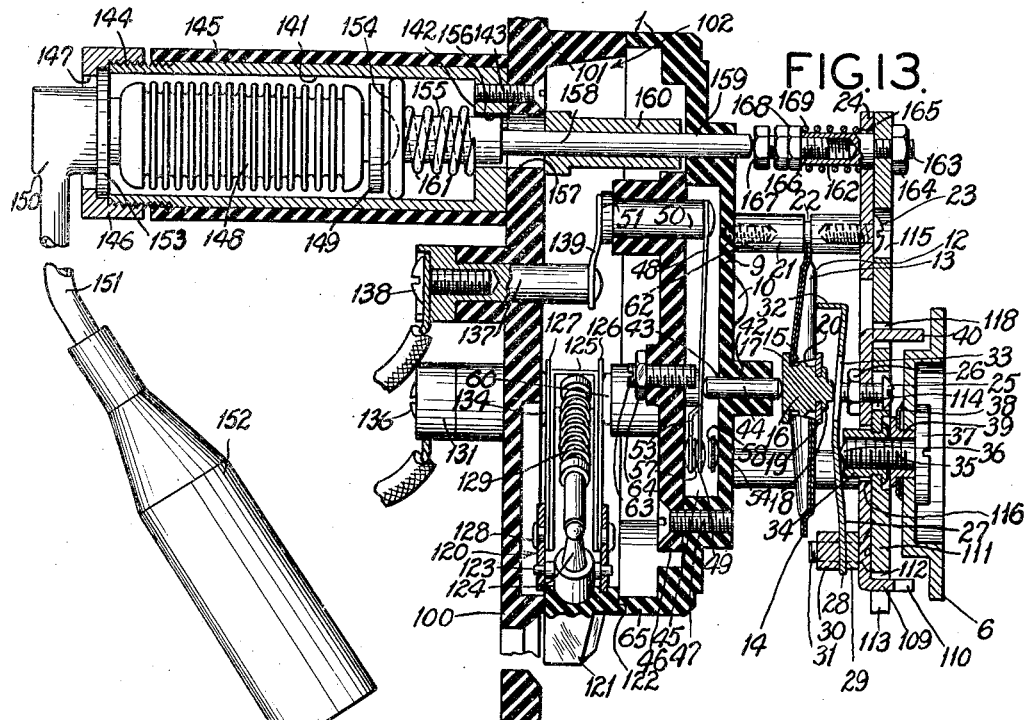
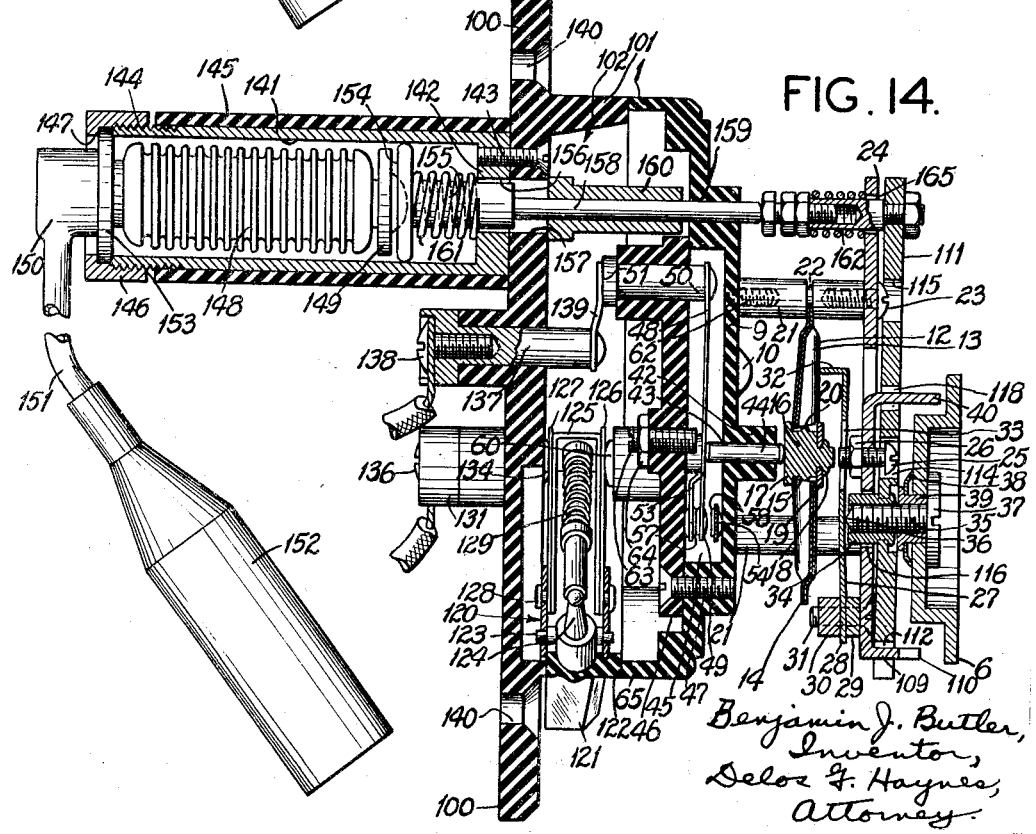

Patented Apr. 4, 1939

2,153,297

UNITED STATES PATENT OFFICE 2,153,297

THERMOSTATIC CONTROL

Benjamin J. Butler, Attleboro, Mass., assignor, by mesne assignments, to Metals & Controls Corporation, Attleboro, Mass., a corporation of Massachusetts Application May 4, 1936, Serial No. 77,706

4 Claims. (Cl. 200—83)

This invention relates to thermostatic controls, and with regard to certain more specific features, to thermostatic electric controls.

Among the several objects of the invention may be noted the provision of a thermostatic electric control particularly adapted for use in controlling ambient temperatures within a room or building, said control being such as to permit the free circulation of an ambient medium within the room or building around the thermally sensitive portion of the device, while at the same time embodying means for automatically controlling the action of said thermostatically sensitive portion of the device in accordance with ambient temperature changes at a position remote to the interior of the room or building, such as the exterior of the room or building; and the provision of a thermostatically electric control of the class described wherein the last-mentioned automatic control is effective only upon variation of the remote ambient medium only within certain predetermined limits. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a front elevation of a control embodying the present invention;

Figure 4:
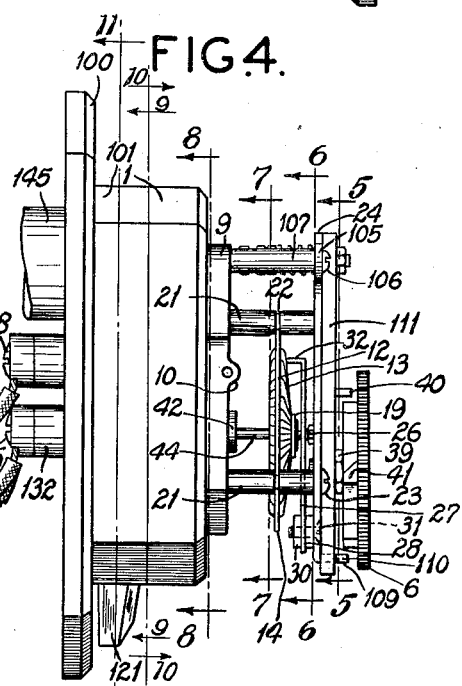
Fig. 4 is a side elevation of the control of Fig. 3 with the cover removed.

Figures 5, 6, 7, 8, 9, 10, and 11, are, respectively, vertical sections taken substantially along lines 5—5, 6—6, 7—7, 8—8, 9—9, 10—10, and 11—11, of Figures 4 and 12.

Figure 3:
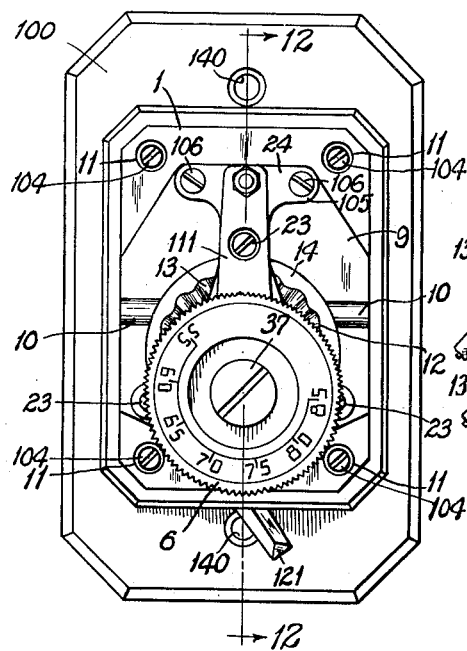
Fig. 3 is a front elevation of the control of Fig. 1 with the cover removed.

Fig. 12 is an enlarged cross section taken substantially along line 12—12 of Fig. 3; and, Figures 13 and 14 are sections similar to Fig. 12 showing alternative operating positions.

Similar reference characters indicate corresponding parts throughout the several views of the drawings.

The present invention is, in some respects, an improvement on the control shown in John A. Spencer United States Patent 2,010,649, dated August 6, 1935.

Certain features of a thermostatic electrical switch, forming a part of the present invention, are described and claimed in my co-pending application Serial Number 77,707, filed May 4, 1936.

Figure 1:
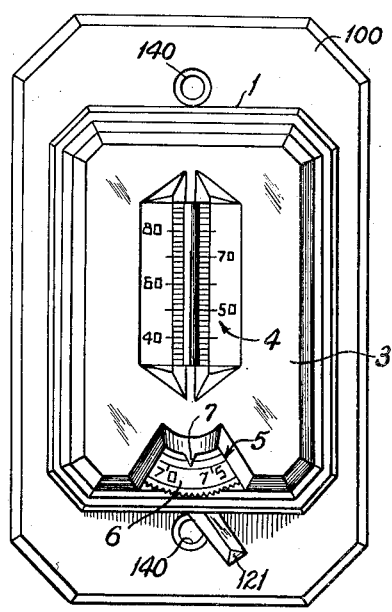
Figure 2:
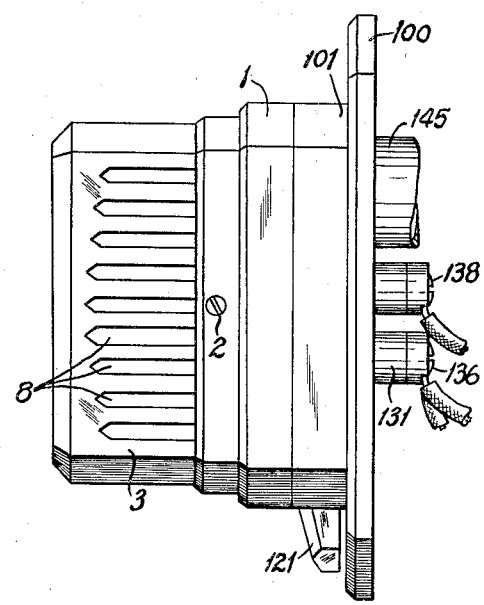
Fig. 2 is a side elevation of the control of Fig. 1.

Referring now more particularly to Figures 1, 2, and 9, numeral 100 indicates a sub-base plate which is preferably molded from Bakelite or some similar electrically insulating material. Projecting from the front of the sub-base 100 is a substantially rectangular box portion 101, which is inwardly hollow providing a chamber 102. Numerals 103 indicate inwardly projecting solid corner blocks forming part of the box 101, said corner blocks 103 receiving screws 104 which serve to mount a base plate 1, preferably likewise molded from Bakelite or similar electric insulating material, on the sub-base 100.

Secured to the base 1 by screws 2 (see also Fig. 2) is a rectangular cover 3, which is usually, although not necessarily, made of metal such as brass. Numeral 4 indicates a thermometer and scale for reading the same which is usually provided in the face of the cover 3. Numeral 5 indicates a beveled opening that is provided in the central lower edge of the front face of the cover 3, to make available an adjusting disc 6 to be described hereinafter. The disc 6 carries suitable indicia thereon, which are referred to a marker or pointer 7 formed on the edge of the notch 5 from the metal of the cover 3. All four sides of the cover 3 are provided with numerous openings 8, which permit the free circulation of the ambient medium to the thermostatic mechanism contained within the cover 3.

The base 1 has molded on its front face a platform or raised portion 9 (see Figures 3 and 4). The platform 9 has in turn molded or formed therein projections 10, which edgewise receive the screws 2 for securing the cover 3 to the base 1. The base 1, outside the confines of the platform 9, is provided with suitable screw holes 11 through which pass the screws 104 mounting the base 1 upon the sub-base 100.

Mounted on the platform 9 is a thermally sensitive or responsive arrangement, which is similar in many respects to the thermostat described and claimed in John A. Spencer Patent 1,972,832, dated September 4, 1934. Briefly, the thermal actuating element of the present embodiment preferably comprises a radially corrugated, snap-acting thermostatic disc indicated by numeral 12. The disc 12 is described and claimed in detail in John A. Spencer Patent 1,895,591, dated January 31, 1933, where it will only be described in general herein. A non-corrugated snap-acting thermostatic disc of the type described and claimed in John A. Spencer Patent 1,448,240, dated March 13, 1923, may likewise be used under some circumstances. Briefly, the disc 12 comprises a radially corrugated central portion 13 (see also Fig. 6), and an uncorrugated, flat rim portion 14. The disc 12 is made of thermostatic metal, such as bimetal, and is initially given a slight conical conformation in one direction, for example, that illustrated in Fig. 12. It will likewise be seen from Fig. 12 that the disc 12 has a central opening 15, in which is mounted a plug 16. The plug 16 has a head 17 on one edge which prevents it from passing through the opening 15, while it is upset at its other end, as indicated at numeral 18, in order to retain a washer 19 in position, thus preventing the removal of the plug 16 from the disc 12 in the other direction. A circular bead 20 on the periphery of the plug 16 tends to keep the plug 16 always centered within the opening 15. It will be understood that the flange 17, washer 19, and bead 20 are all relatively loose with respect to the disc 12, so that they do not bind or inhibit its motion in any respect.

Figure 5:
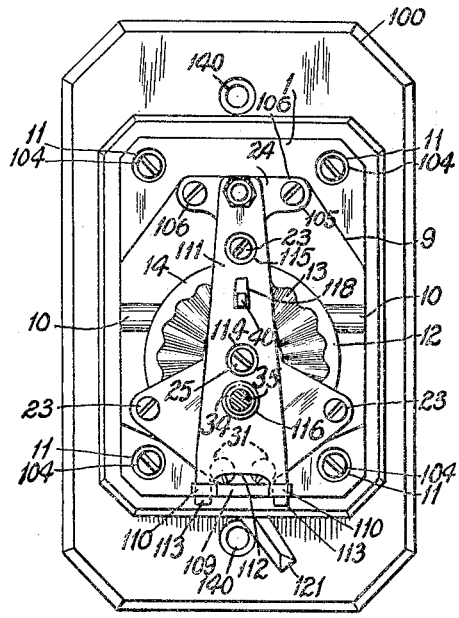
Figure 6:
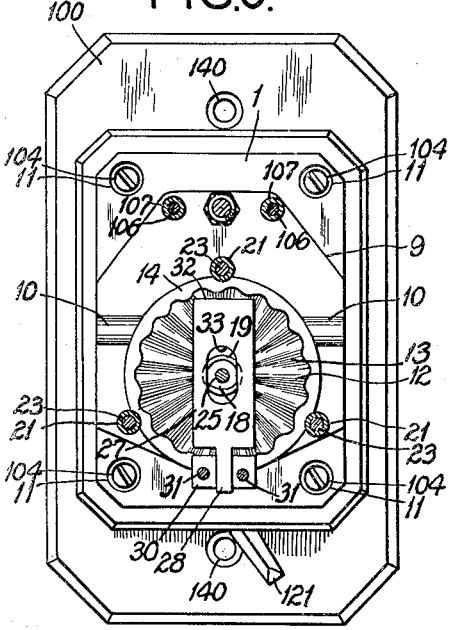

The disc 12 is mounted in a position parallel to the base 1 by means of three angularly spaced columns 21 (see also Fig. 6). Each column 21 has a groove 22 therein, into which fits the flat periphery 14 of the disc 12. Columns 21 are held to the base 1 by means of suitable screws 62. At their upper ends they receive screws 23, which serve to mount, above the disc 12 but parallel thereto, a mounting plate 24 (see also Figures 4 and 5).

The plate 24 has, at its upper end, a T-shaped head 105, the extremities of which receive screws 106, which engage with columns 107 (see Fig. 7) similar to columns 21. Screws 108 secure the columns 107 to the base 1.

Plate 24 has threadedly mounted therein a machine screw 25, the inner end of which (see Fig. 12) abuts the plug 16 in the center of the disc 12, for the purpose of limiting the movement of the disc 12 in a direction away from the base plate 1. A lock nut 26 serves to hold the adjustment of screw 25.

The mounting plate 24 also serves to mount a spring lever 27 (see Fig. 6). The mounting means for the lever 27 comprise a narrow projection 28 on said lever, which projection 28 is clamped between a pair of blocks 29 and 30 that are held to the underside of the plate 24 by means of screws 31. By loosening the screws 31, the projection 28 may be moved in and out from between the blocks 29 and 30, thus effecting longitudinal adjustment of the spring lever 27. The other end of the spring lever 27 is bent downwardly, as indicated by numeral 32, to rest against one of the corrugations in the corrugated region 13 of the thermostatic disc 12. The lever 27 is preferably made of a resilient, springy material such as thin steel. An opening 33 in the lever 27 provides for the passage of the screw 25, so that said screw 25 does not interfere with the action of the lever 27.

From the lower edge of the plate 24 there is bent upwardly and outwardly, at right angles, a projection 109 (see Figures 4, 5 and 12). The projection 109 has the shape of a T with sideward or lateral projections 110 extending therefrom. Fulcrumed on the projection 109 behind the projections 110, is a relatively rigid or non-bendable lever 111, which extends the length of the plate 24. The lever 111 has a recess 112 cut from its lower edge, providing legs 113. The legs 113 are positioned behind the lateral projections 110 of the projection 109, to retain the lever 111 in position. The fulcrum action is obtained between the edge of the recess 112 and the edges of the projection 109. The lever 111 has an opening 114 therein to permit access to the screw 25, and likewise an opening 115 to permit access to the screw 23. Normally, the lever 111 lies flat against the plate 24.

Mounted in the lever 111 in a position slightly beneath the opening 114, is an interiorly threaded bushing 34 (see Figures 5 and 12). An oversized opening 116 in the plate 24 clears the bushing 34 from obstruction by the plate 24. The bushing 34 receives a screw 35, which has a conical point 36 bearing against the spring lever 27. The other end of the screw 35 carries the adjusting disc or dial 6 heretofore referred to. The dial 6 is clamped between the head 37 of the screw 35, a spring friction washer 38 and a nut 39, so that its angular position relative to the screw 35 may be adjusted frictionally. An ear 40 is stamped forwardly from the plate 24, passes freely through an oversized opening 118 in the lever 111, and engages one or more projections 41 (see Fig. 4) on the back side of the dial 6 for the purpose of limiting the rotation of the dial 6.

The elements thus far described comprise the thermally responsive portion of the device as a whole, and the means for its adjustment, as will be pointed out hereinafter. The electrical switching portions of the device will next be described.

Figure 7:
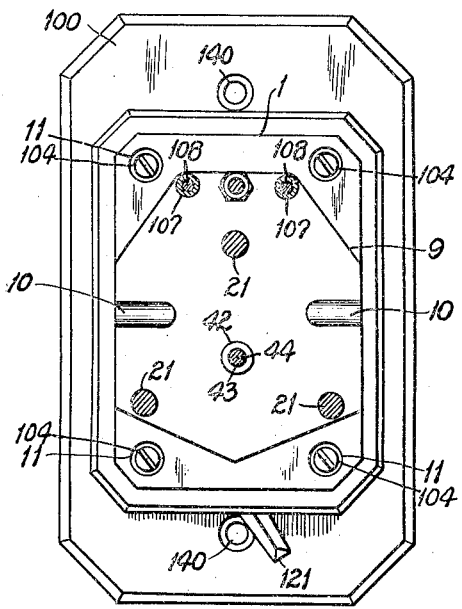

Referring to Figures 7 and 12, numeral 42 indicates a bushing molded into the base 1, extending upwardly from the platform 9. The bushing 42 has a central hole 43 therein, in which loosely slides a pin 44. The pin 44 and hole 43 are both preferably accurately cylindrical, and carefully smoothed, so that there is a minimum of friction occasioned by the sliding of the pin 44 in the hole 43. The pin 44 is desirably made of Bakelite or some other light-weight material. In the embodiment shown in the drawings, it weighs but a few grains, and hence its mass is negligible.

Figure 8:
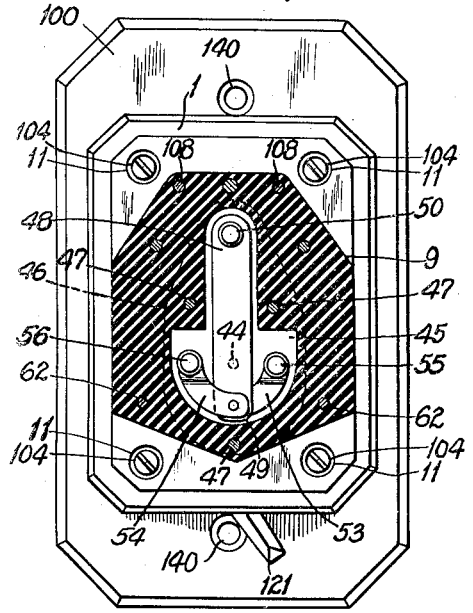

The underside of the platform 9 is hollowed out to provide a chamber 45 (see Figures 8 and 12). The chamber 45 is rearwardly closed by a Bakelite or like insulating material plate 46 (Figures 10 and 12), which is held in position by screws 47. On the plate 46 are mounted the electrical switching elements. These comprise the following: Numeral 48 indicates a relatively long, spring contact arm, which carries at its lower end a double-faced electrical contact button 49, which is preferably made of a good conducting material such as silver. The contact 49 has a conducting face on each side of the blade 48. The other end of the blade 48 is mounted upon a post 50, which is molded into the plate 46. On the other side of the plate 46, the post 50 has a smooth contact face 51, by which electrical connection may be made to the blade 48.

Numerals 53 and 54 indicate a pair of arcuate contact blades that are mounted on posts 55 and 56, respectively, which posts 55 and 56 are molded into plate 46 in the same manner as the post 50. The blade 53 is bent back against the face of the plate 46, as shown in Figures 8 and 12, and carries at its free end a contact button 57. On the other hand, the arcuate blade 54 is bent upwardly from the post 56 in order to be positioned near the face of the base member 1, and it carries an inwardly facing contact button 58. The contact buttons 57 and 58 are preferably formed of a good conducting metal, such as silver, and are so located that they are capable of contacting with the contact button 49 mounted on the blade 48. The buttons 57 and 58 are spaced apart a sufficient distance so that the button 49 may alternately make contact with either the button 57 or the button 58.

The posts 55 and 56 are, on the back of the plate 46, provided with smooth contact faces 59 and 60 by which connections may be made to their respective contact blades.

The spring arm 48 is formed with a tension tending to move it in a direction causing juxtaposition of the contacts 49 and 58 (in other words, to the position shown in Fig. 12), so that a positive pressure on the pin 44 is needed to move it to juxtapose the contacts 49 and 57.

A screw 63 (see Figures 10 and 12), held in position by a lock nut 64, is provided in the plate 46 to limit backward movement of the spring arm 48, and hence to limit backward movement of the pin 44 and the disc 12, as will be pointed out hereinafter.

A depending flange or skirt 65, molded as part of the base 1, encloses the plate 46 and all the devices supported thereon. The edge of the flange or skirt 65 abuts the upper edge of the box 101 of the sub-base 100.

Referring to Figures 9, 11 and 12, numeral 120 indicates an overcentering toggle switch which is pivotally mounted on the sub-base 100 in the enclosure 102. The switch comprises a handle 121, which projects through an opening 122 in the lower edge of the box 101. The handle 121 is pivoted on a pin 123 but has a projection 124 extending beyond said pin. Numeral 125 indicates a switch arm assembly which has front and back contacting faces 126 and 127 respectively. The switch arm is pivoted on pins 128. A compression spring device 129 reacts between the free end of the switch arm 125 and the end of the projection 124 on the handle 121, providing for a snap, overcentering toggle movement of the switch arm 125 when the handle 121 is rotated. A pin 130 limits the rotary movement of the switch arm 125. The contacting faces 126 and 127 are electrically connected together. The contacting face 126 is positioned to resiliently engage, in its alternative positions, the contacting faces 59 and 60 for the respective contact buttons 57 and 58.

In exactly opposite positions to the contacting faces 59 and 60 are mounted, in the sub-base 100, pillars 131 and 132, which have, respectively, contacting faces 133 and 134 on the inside face of the sub-base 100 in position to be engaged by the contacting face 127 of the movable switch arm 125. The pillars 131 and 132 are exteriorly provided with connecting screws 135 and 136, respectively. Thus it is seen that when the rotatable switch handle 121 is in one position, the rotatable switch arm is in an analogous position, and making electrical connection between the contact button 57 and the exterior connecting screw or terminal 136, while when the handle 121 is in its opposite position, the contact button 58 is electrically connected to the exterior terminal screw 135.

Numeral 137 indicates a post mounted in the sub-base 100. The post 137 exteriorly carries a connecting screw 138 and interiorly carries a spring connecting arm 139 which is positioned to contact the contact face 51, which is in electrical connection with the blade 48 and movable contact button 49. The exterior screw 138 accordingly comprises terminal means for making electrical connection to the movable contact button 49.

The three exterior screws 135, 136 and 138 accordingly comprise the exterior terminals for electrical connections to the control of the present invention.

The sub-base 100 is provided with holes 140 for accommodating screws for mounting the control as a whole.

Referring now more particularly to Fig. 12, numeral 141 indicates a cylinder having a closed end 142 secured by a plurality of screws 143 to the back of the sub-base 100. The cylinder 141 is threaded at its outer end 144. A second cylinder 145 of insulating material slips over the cylinder 141 and covers it for substantially all of its length, leaving only the threaded end 144 exposed. The threaded end 144 receives a cap 146, which has an opening 147 in its top. Fitting in the cylinder 141 is a compressible, sealed bellows unit 148, which has a pillow block 149 at its inner end. The outer end of the bellows 148 is connected by means of an elbow connection 150 to a capillary tube 151 which leads to a bulb unit 152 (see Figures 13 and 14). The elbow 150 has a disc 153 permanently affixed thereon, the disc 153 being clamped between the end of the cylinder 141 and the cap 146 to provide a reaction point for the bellows unit. The bellows 148, elbow 150, capillary tube 151, and bulb 152, all comprise a hermetically sealed system which is filled with a fluid which has the characteristic of undergoing a considerable expansion within the temperature range concerned.

Pillow block 149 at the free end of the bellows 148 bears against the face 154 of a plunger 155. The plunger 155 is movable through openings 156 and 157 in the base 142 of the cylinder 141 and the sub-base 100, respectively. A shaft 158 forms a forward extension, of reduced diameter, of the plunger 155. Shaft 158 slides freely through an opening 159 in the platform 9 of base 1. A loose, sliding insulating bushing 160 is positioned on the shaft 158 between the sub-base 100 and the base 1, for protective purposes. A compression spring 161 reacts between the plunger 155 and the inside of the bottom 142 of the cylinder 141. The compression spring 161 has the tendency of withdrawing the plunger 155, and the shaft 158, into the cylinder 141 against the compressive resistance of the bellows 148.

Numeral 162 indicates a cylindrical element which is mounted on the lever 111 by means of a threaded extension 163 of the element 162 and a nut 164. The element 162 projects rearwardly at right angles from the lever 111 and passes freely through an oversized hole 165 in the plate 24 provided for that purpose. Rearwardly, the element 162 is drilled and threaded to receive a bolt 166, the head 167 whereof is coaxial with the shaft 158. Lock nut 168 enables the bolt 166 to be positioned in such a manner that the head 167 normally abuts, or is spaced a slight distance from, the end of shaft 159. A compression spring 169 encircles the element 162 and reacts between the under side of one of the nuts 168 and the rear side of the plate 24, this compression spring 169 having the tendency of holding the lever 111 flat against the plate 24, and hence the bolt head 167 in its rearmost position.

The lever 111, it will be seen, comprises, in conjunction with the bellows unit 148 and the spring lever 27, a pressure-responsive means arranged to apply a force to the movable portion of the thermostatic disc 12.

This completes the description of the elements of the control per se.

In installing the control for operation, the following precedure should be followed.

The control is desirably installed on the wall in a room the temperature of which is truly representative of the temperature of the building to be controlled. Preferably, the control is installed in such a position that a natural circulation of the air within the room flows past the control, so that the thermostatic disc 12 can accurately represent the temperature condition within the room at all times.

The bulb 152 is positioned outside of the building, the capillary tube 151 being run through the walls and partitions, if necessary, to connect to the bellows unit 148. The control is designed for use with a house having complete air-conditioning system; that is, one which includes both a heating unit and a cooling unit. Electrical connections are made between the control and the heating unit and cooling unit in the following manner:

One wire of the power circuit is connected directly to both the heating unit and the cooling unit. The other wire of the power circuit is connected to exterior terminal 138 on the back of the control. A connection is then made from terminal 135 to the other power connection of the heating unit, and from terminal 136, another connection is run to the other power connection of the cooling unit. Under these conditions, the thermostatic disc 12 in its forwardly concave position as illustrated in Fig. 12, is in its "cold" position. Its backwardly concave position, illustrated in Figures 13 and 14, is its "hot" position.

The operation of the device as thus installed is as follows:

As described in the aforesaid John A. Spencer Patent 1,972,832, the thermostatic disc 12 is subject to two adjustments, namely, the adjustment of its operating differential, and the adjustment of its operating temperature. The operating differential, which is defined as the difference between the temperatures at which the disc snaps on increasing and decreasing ambient temperatures, is adjusted by limiting the extent of throw or movement of the disc. In the present embodiment, such differential adjustment is provided by the screws 25 and 63. The screw 25 limits the movement of the disc 12 to the right (in Fig. 12) while the adjustment of the screw 63 limits the movement of the disc 12 to the left. The reason for this adjustment need not be gone into in detail in the present application, as it is described fully in said Patent No. 1,972,832. Ordinarily, the differential adjustment is made before the thermostat leaves the factory, and is not altered except at rare intervals and by skilled workmen.

The adjustment of the operating temperature of the disc, that is, the temperature at which the disc snaps from its position of conicity in one direction to its opposite position of conicity, however, is an adjustment which needs to be made by the user from time to time, as he desires a higher or lower room temperature. In the present embodiment, as in said Patent No. 1,972,832, this adjustment is provided by varying the force exerted on the surface of the disc 12 by the spring lever 27, in turn by threading the screw 35 more or less into the bushing 34, in turn by turning the disc 6. The greater the force on the disc 12 provided by the spring lever 27, the lower the temperature at which the disc 12 will snap from its Fig. 10 position to its Fig. 11 position. The reasons for this action are likewise described in said Patent No. 1,972,832, and are not repeated in detail herein.

Under normal conditions the lever 111, in which is mounted the bushing 34, lies flat against the plate 24 and hence may be considered for the moment as constituting a part of the plate 24. The compression spring 169, it is to be noted, is considerably stronger than the spring lever 27 so that the resilience of the spring lever 27 does not result in the lifting of the lever 111 from the plate 24 against the spring 169.

It may be assumed, as heretofore stated, that the disc as shown in Fig. 12 is in its cold position. When, for example, the temperature rises to a predetermined value, as determined by the angular position of the disc 6, and the differential of the particular disc 12, the disc 12 snaps over to its opposite position of conicity, as illustrated in Fig. 13. In so doing, it abuts the pin 44, and moves said pin 44 in the hole 43, bringing the opposite end of the pin 44 to bear against the spring 48 and thus moving the contact 49 from its position of engagement with the contact 58 to a position of engagement with the contact 57, all as shown in Fig. 13.

The contact 57 is connected, through the contact surface 60 and the switch arm 125, to the exterior terminal screw 136, which as has been explained, is connected to the heater circuit. This means that the heater circuit will be closed and heat will correspondingly be generated and supplied to the room. This all assumes that the switch handle 121 is in its right-hand position, as illustrated throughout the drawings.

When the exterior temperature is below a certain level, the bellows 148 is correspondingly retracted and the shaft 158 is sufficiently retracted that it never contacts the bolt head 167. However, if the exterior temperature suddenly rises above said predetermined level, there is a desirability that the interior of the house should receive from its heating plant not quite so great an amount of heat because of the various factors such as rate of radiation from the house to the exterior which have changed with the increased temperature. When the exterior temperature rises above such a predetermined value, the bellows 148 expand and in so doing, move the plunger 155 and shaft 158 to the right in Fig. 12, causing the position illustrated in Fig. 14 to be assumed. Here it will be seen that the end of the shaft 158 abuts the bolt head 167, and thereby rotates the lever 111 on the projection 109 against the action of compression spring 169. Since the bushing 34 is mounted in the lever 111, this results in a removal of the bushing a certain distance from the spring lever 27, relaxing part of the pressure on said spring lever in the same manner as if the setting dial 6 were rotated in such a direction as to lower the temperature setting. Under such conditions, the mounting temperature of disc 12 is lowered and said disc operates as if it were set to maintain the ambient temperature of the room at a generally lower value.

The lost-motion connection between the end of shaft 158 and the bolt head 167 is important in the present invention, constituting a feature of distinction over aforesaid Spencer United States Patent 2,010,469. For ordinary winter heating operation, overcentering toggle switch 120 is moved to its left-hand or heating position which closes the circuit between contacting faces 59 and 133, wherein the circuit to the central heating apparatus only is operative.

Under ordinary winter operating conditions, when the thermostatic disc 12 is in its Fig. 12 position, and the movable contact 49 touches the contact 57, nothing happens because the contact face 60 to which the contact button 57 is attached is not, at the time, connected to anything. For summer operations requiring the cooling unit of the household air-conditioning system, however, the switch handle 121 is moved to its alternate, or right-hand position, in Fig. 1, and the movable switch arm 125 then connects the contact 60 (which is electrically connected to the contact button 57) to the exterior terminal 136.

Under such summer operating conditions when the disc 12 is in its backward or Fig. 13 position, the house is too hot, and requires cooling. Under such conditions it will readily be seen that connection is made from the terminal 138 through the movable contact 49 to the fixed contact 57 and thence to the contact face 60, the switch arm 125 and the contact face 134, to the exterior terminal 136, thereby completing the electric circuit to the cooling unit which is accordingly thrown into operation. Snapping of the thermostatic disc 12 from its Fig. 13 position to its Fig. 12 position, under such circumstances, discontinues the operation of the cooling unit, although it does not throw the heating unit into operation unless the switch handle 121 is again moved to its left-hand position.

Under normal conditions the switch handle 121 is operated only with the change of seasons and is left untouched from week to week within the seasons, except as extraordinary conditions demand its movement.

The bellows unit 148 also comes into play under certain summer operation conditions when the switch handle 121 is in its right-hand position. Under such circumstances, if the exterior temperature is above a certain high level, the lever 111 is operated so that the Fig. 14 position is assumed. This means in effect, that the temperature setting of the dial or disc 6 has been "increased" a proportional part of the increase of outdoor temperature over the indicated indoor value, which in turn means that the cooling unit will remain in operation until the house is cooled to a lower temperature than outdoor values, but higher than the dial setting of the instrument. This is advantageous, for under conditions of unusually high external heat, it is known that the house interiorly should not be cooled excessively, because cooling to such an extent would cause discomfort to the occupants of the house on entering or leaving it, and in addition would increase the cost of indoor cooling unnecessarily. In other words, the action of the control in cooling operation, is to operate the central cooling apparatus in response to the call for lowered room temperatures, but to temper or compensate the value at which the control is satisfied, depending upon the extent of outdoor temperature use.

Under certain circumstances, the radially corrugated thermostatic disc 12 may be replaced by a non-corrugated non-developable thermostatic disc of the type shown in John A. Spencer Patent No. 1,448,240, dated March 13, 1923. Both thermostatic discs, it will be understood, are broadly classifiable as snap-acting devices.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A control device comprising a snap-acting disc, means supporting said disc at the periphery thereof leaving the central portion of said disc free to snap, means abutting the central portion of said disc to limit the amplitude of movement thereof, a resilient lever having one of its ends bearing upon said disc between said peripheral and said central portions thereof, and its other end relatively fixedly mounted, said lever controlling the tendency of said disc to snap, and pressure-responsive means arranged to apply force to an intermediate portion of said lever, and through said lever to the central portion of said disc, said pressure-responsive means including lost-motion means whereby the pressure is ineffective until it reaches a predetermined value.

2. An electrical control comprising a snap-acting disc, means supporting said disc at the periphery thereof leaving the central portion of said disc free to snap, stationary contact means, movable contact means operated by the central portion of said disc arranged to cooperate with said stationary contact means, means abutting the central portion of said disc to limit the amplitude of movement thereof, a resilient lever having one of its ends bearing upon said disc between the said central and peripheral portions thereof, and its other end relatively fixedly mounted, said lever controlling the tendency of said disc to snap, and pressure-responsive means arranged to apply force to an intermediate portion of said lever, and through said lever to the central portion of said disc, said pressure-responsive means including lost-motion means whereby the pressure is ineffective until it reaches a predetermined value.

3. A control as set forth in claim 2 in which the disc is formed of thermostatic material, whereby it is made responsive to temperature variations.

4. A control as set forth in claim 2 in which the disc is formed of thermostatic material, whereby it is made responsive to temperature variations in the vicinity of said control, and in which the said pressure-responsive means is in turn controlled by temperature-responsive means remote to the said control.

BENJAMIN J. BUTLER.